United States Patent [19]
Heckathorn

[11] 3,982,350
[45] Sept. 28, 1976

[54] FISHING LINE WEIGHT

[76] Inventor: Donald W. Heckathorn, No. 20 Paseo Margarita, Camarillo Springs, Calif. 93010

[22] Filed: Nov. 6, 1974

[21] Appl. No.: 521,239

[52] U.S. Cl. .................................................. 43/43.1
[51] Int. Cl.² ............................................ A01K 95/00
[58] Field of Search ................ 43/44.4, 43.1, 43.12, 43/12, 42.74

[56] References Cited
UNITED STATES PATENTS

| | | | |
|---|---|---|---|
| 834,905 | 11/1906 | Haskell | 43/12 |
| 844,594 | 2/1907 | Haskell | 43/12 |
| 2,598,011 | 5/1952 | Pitre | 43/44.4 |
| 2,763,955 | 9/1956 | Mead | 43/42.74 |
| 2,982,049 | 5/1961 | Yost | 43/44.4 |
| 3,081,574 | 3/1963 | Wise | 43/43.12 |
| 3,197,912 | 8/1965 | Kramer | 43/44.4 |
| 3,346,986 | 10/1967 | Tiikkainen | 43/43.12 |
| 3,492,752 | 2/1970 | Viveiros | 43/44.4 |

Primary Examiner—Warner H. Camp
Attorney, Agent, or Firm—Lindenberg, Freilich, Wasserman, Rosen & Fernandez

[57] ABSTRACT

A device for simply attaching a stone or rock to a fishing line to function as a casting or sinker weight. The device includes a flexible elastic strap capable of encircling a stone or rock and conforming to its peripheral surface. The device further includes means for securing the strap to a fishing line.

5 Claims, 7 Drawing Figures

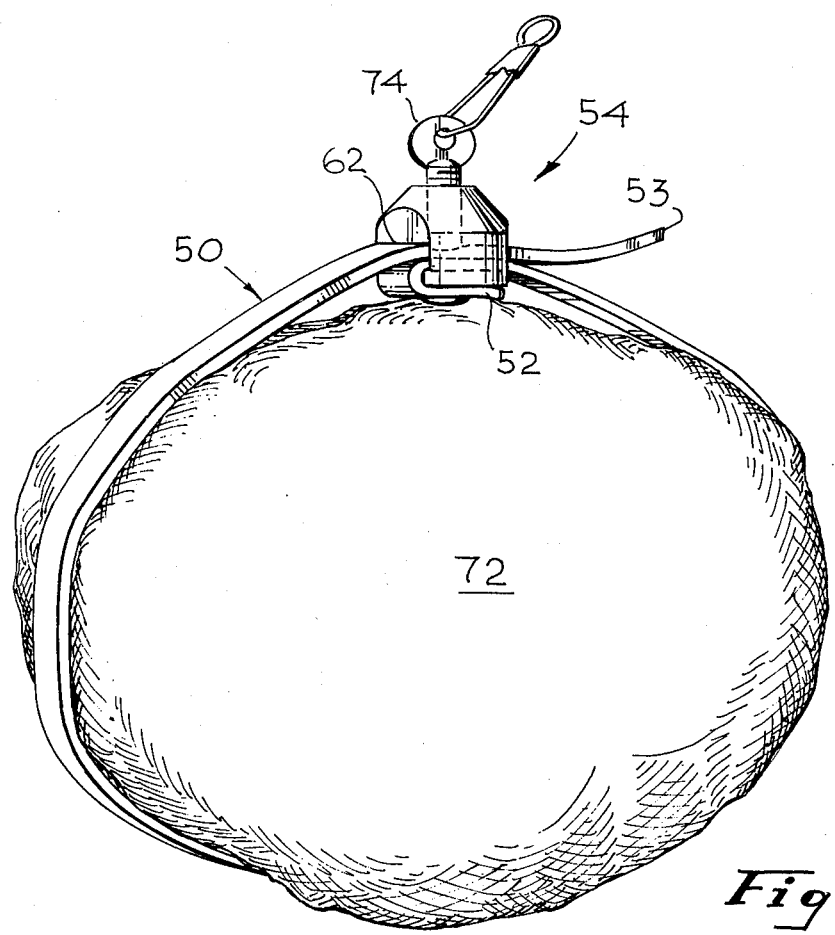
Fig. 5
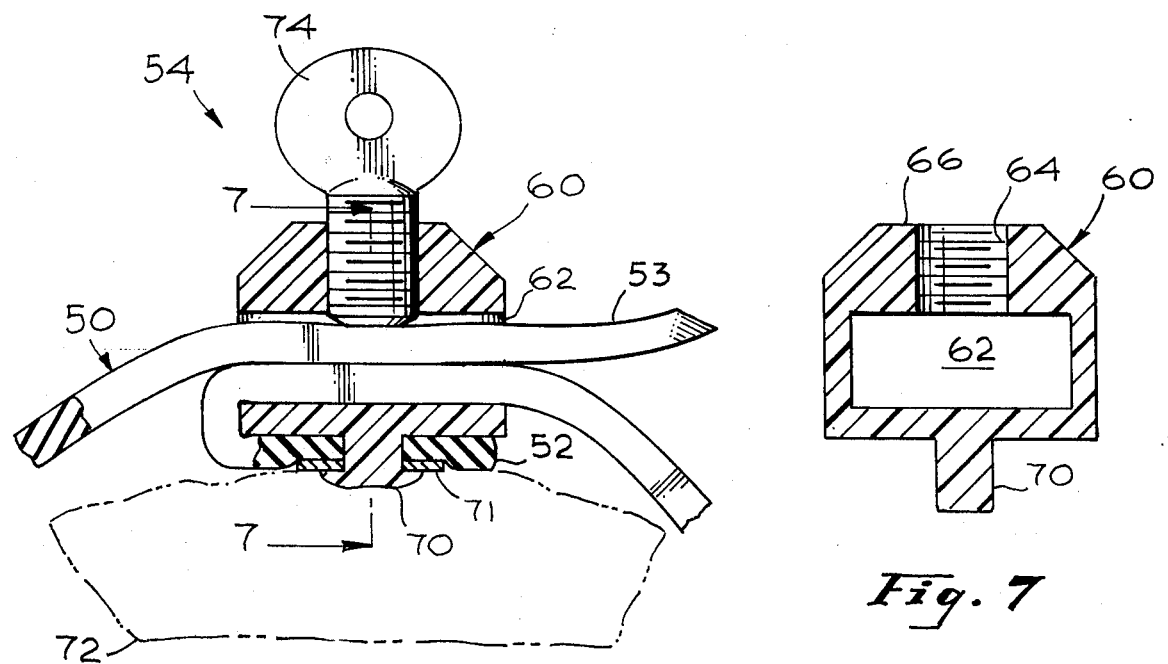
Fig. 6
Fig. 7

3,982,350

FISHING LINE WEIGHT

BACKGROUND OF THE INVENTION

This invention relates generally to fishing equipment and more particularly to means for attaching a stone or rock to a fishing line to function as a casting or sinker weight.

Fishermen attach different weights to their lines in different manners depending upon the type of fishing being done. For example, in stream fishing, a weight may be selected which is sufficiently heavy to permit casting but sufficiently light to prevent the weight from dragging the bait to the stream bed. On the other hand, for some types of ocean fishing, it is desirable to employ a very heavy weight to actually pull the bait down to the ocean floor. Typically, the weights sold by fishing equipment outlets comprise pieces of lead having holes therein. Unfortunately, in use, much of this lead weight is lost in the ocean, lakes, and streams and constitutes a poisonous threat to fish life. Since stones and rocks of varying sizes are generally freely available to the fishermen close to the fishing site, means are provided in accordance with the present invention for conveniently and inexpensively attaching such stones or rocks to the fishing line.

SUMMARY OF THE INVENTION

The present invention is directed to a device for attaching a stone or rock to a fishing line to function as a casting or sinker weight. In accordance with the invention, a flexible elastic strap is provided together with means for adjusting the effective strap length to permit it to encircle a stone or rock and closely conform to the peripheral surface thereof.

In a first embodiment of the invention, the strap is formed as an endless band with a slide being provided thereon for adjusting the length of strap in the portion formed to accommodate a stone. A vast portion is provided on the strap to enable a fishing line to be wrapped around it for temporary retention. A hole is preferably provided in the strap material to permit the strap to be secured to a fishing line when desired. When used as a casting weight, the fishing line is preferably wound around the post in a manner such that the device is released soon after impact with the water. When used as a sinker weight, the device remains attached to the fishing line.

In a second embodiment of the invention, useful primarily for accommodating large rocks, a strap length is utilized which has one end secured to a slide fastener and a second end removably receivable in the slide fastener for adjusting the length of strap encircling the rock. The slide fastener includes means enabling the clamping force exerted on the strap to be varied so as to enable a fisherman to assure that the rock, but not the device, is released after continued dragging on the ocean floor.

The novel features of the invention are set forth with particularity in the appended claims. The invention will best be understood from the following description when read in conjunction with the accompanying drawings.

BRIEF DESCRIPTION OF THE DRAWINGS

FIG. 5 is a perspective illustration showing a second embodiment of the invention for attaching a large rock to a fishing line;

FIG. 6 is an enlarged sectional view of the clamp mechanism of FIG. 5; and

FIG. 7 is a vertical sectional view taken substantially along the plane 7—7 of FIG. 6.

DESCRIPTION OF THE PREFERRED EMBODIMENTS

Figure 1:
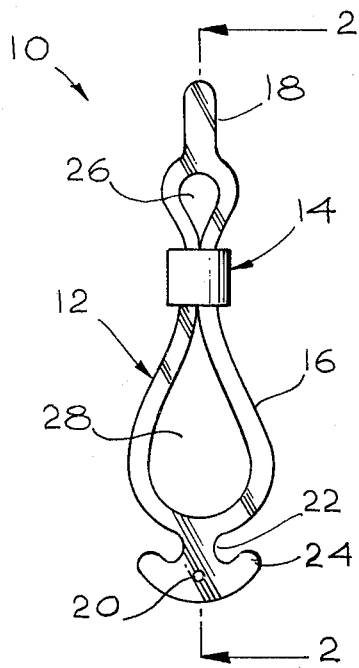
FIG. 1 is a plan view of a device in accordance with the present invention for attaching stones and small rocks to a fishing line.
Figure 2:
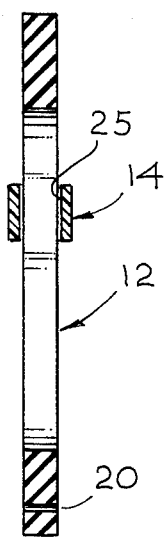
FIG. 2 is a vertical sectional view taken substantially along the plane 2—2 of FIG. 1.

Attention is initially called to FIGS. 1 and 2 which illustrate a first embodiment of a device 10 for easily and inexpensively attaching stones or rocks to a fishing line. The device 10 is comprised of a strap member 12 and a slide fastener member 14.

The strap member 12 includes a flexible strap portion 16 forming an endless band. The strap portion 16 is formed of a material such as rubber, which is preferably elastic so as to permit its length to be extended from an unstressed length, represented in FIG. 1, to enable it to be stretched around a stone.

A protuberance 18 projects outwardly from the strap portion 16. A post 22, located substantially opposite to the protuberance 18, also extends outwardly from the strap portion 16 and defines a hole 20 therein. The post 22 carries a flange member 24 for a purpose to be described hereinafter. The strap member comprised of portion 16, protuberance 18 and post 22 is preferably integrally molded of a suitable material such as rubber. The strap portion 16 is preferably of rectangular cross-section so as to define a relatively wide surface area for engaging the surface of a stone.

The slide fastener member 14 comprises a substantially toroidal sleeve having a central opening 25 extending therethrough. The opening 25 has a cross-sectional area sustantially twice that of the cross-section of the strap portion 16. The slide fastener 14 is mounted around two linear portions of the strap portion 16 between the protuberance 18 and post 22. The slide fastener 14 is slidable along the strap portion 16 so as to cause the strap portion 16 to define two spaced closed curves respectively enveloping areas 26 and 28.

Figure 3:
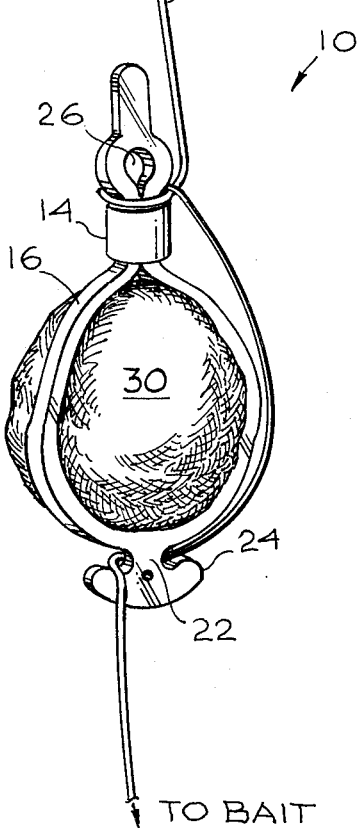
FIG. 3 is a perspective illustration showing the manner of using the device of FIG. 1 to attach a stone to a fishing line as a casting weight.
Figure 4:
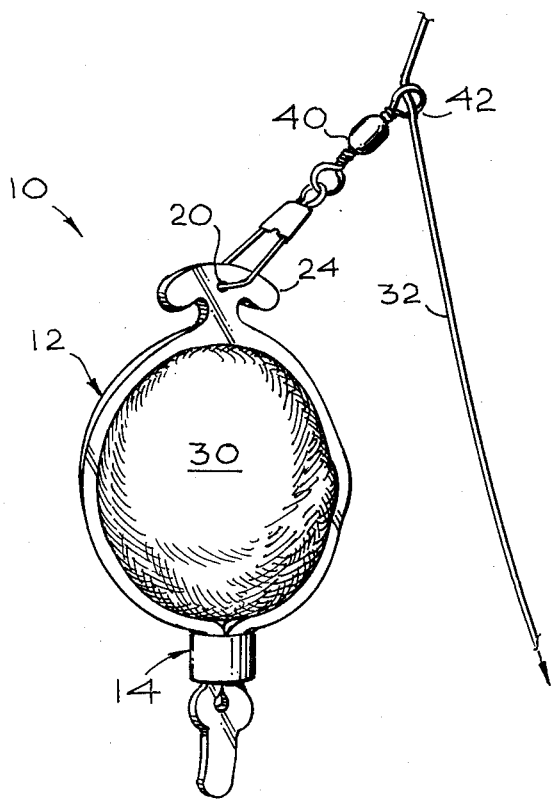
FIG. 4 is a perspective illustration showing the manner of using the device of FIG. 1 to attach a stone to a fishing line as a sinker weight.

The device of FIG. 1 is useful as either a casting weight (represented in FIG. 3) or a sinker weight (represented in FIG. 4). For either application, the fisherman will first locate a stone or small rock, preferably having a substantially smooth surface. The fisherman will slide the fastener 14 toward the protuberance 18 to enlarge the area 28 sufficiently to accommodate the stone. Then the fastener 14 is slid along the strap portion 16 toward the stone stretching the strap portion 16 around the stone and conforming it to the stone's surface.

When the device of FIGS. 1 and 2 is used as a casting weight, the fishing line 32 is initially wrapped around the strap portion 16 above the slide fastener 14 and below the area 26 as represented in FIG. 3. The fishing line 32 is then threaded around the post 22, through one-half or more turns. It will be noted that with the line wrapped around the device 10 as shown in FIG. 3, the line is free to unwrap. That is, after the line is cast aided by the weight supplied by the stone 30, the device 10 will stay attached to the fishing line 32 until the device impacts the water. Thereafter, the stone 30 tends to sink at a faster rate than the more buoyant bait and as a consequence, the line will automatically unwrap itself from around the device 10. Although when used as a casting weight, the device 10 and stone 30 are lost after each casting, the device 10 can be sufficiently low in cost as to be readily disposable.

FIG. 4 illustrates the device 10 utilized as a sinker weight. In this application, a swivel link 40 is threaded through the opening 20 in the protuberance 18. The swivel link 40 is provided with an opening 42 which threads the fishing line 32. When the device 10 is attached to the fishing line 32 as represented in FIG. 4, it will of course be retained on the fishing line and will not be released as is the case when used as a casting weight represented in FIG. 3.

Attention is now called to FIG. 5 which illustrates an alternative embodiment of the invention, particularly designed for attaching large rocks to a fishing line, as for example for deep sea fishing in which it is desired to carry the bait to the ocean bottom. For this purpose, a flexible elastic strap 50 having first and second ends 52 and 53 is provided. Strap first end 52 is secured to a slide fastener 54. The strap is preferably formed of rubber and is sufficiently wide so as to provide a relatively large surface area engaging the rock.

As is best shown in FIGS. 6 and 7, the slide fastener 54 comprises a block 60 having a substantially rectangular opening 62 extending therethrough. An internally threaded screw opening 64 extends through the block 60 from the top surface 66 thereof into the opening 62.

Preferably, the first end 52 of the strap 50 is secured to the under surface of the block 60 as by pin 70 projecting downwardly from the block 60 and through the strap 50. The end of pin 70 is deformed to retain a washer 71 against the strap. The strap then wraps through the block opening 62 to encircle the rock 72 (FIG. 5). The second end 53 of the strap 50 is then inserted through the opening 62 above and in contact with the portion of the strap extending through the opening 62. A thumb screw 74 is threaded in the screw opening 64 and engages the strap 50.

It should be recognized that the second end 53 of the strap 50 can be pulled through the opening 62 to any desired position to conform to the size and peripheral surface shape of the rock 72. Preferably the strap end 53 should be pulled sufficiently tight so as to stretch the strap 50 to better secure the rock 72. The thumb screw 74 is then tightened by the fisherman to achieve the desired clamping force. That is, in some types of ocean fishing, it is desirable to use the weight, here in the form of rock 72, to carry the bait to the ocean floor, Since rocks are readily expendable, it may be desired to leave the rock at the ocean bottom. If this be the case, the fisherman can assure this by adjusting the clamping force supplied by the thumb screw 74 so that as the rock is dragged along the ocean floor or the line is abruptly accelerated, the strap 50 will creep out of the block 60, thereby enlarging the periphery of the closed curve defined by the strap and permitting the rock 72 to drop therefrom. It should of course be recognized that if, on the other hand, it is desired to retain the rock, then maximum clamping force can be applied to prevent such creepage of the strap.

From the foregoing, it should now be recognized that alternative embodiments have been disclosed herein of a device for attaching stones or rocks to a fishing line for the purpose of serving as casting or sinker weights.

Although particular embodiments of the invention have been described and illustrated herein, it is recognized that modifications and variations may readily occur to those skilled in the art and consequently, it is intended that the claims be interpreted to cover such modifications and equivalents.

The embodiments of the invention in which an exclusive property or privilege is claimed are defined as follows:

1. A device for attaching a stone or the like to a fishing line, said device comprising:
    a flexible elastic strap having a certain total length when unstressed;
    adjustable means attached to said strap to form at least a portion of said strap length into a substantially closed curve for encircling, engaging and conforming to an irregular peripheral surface of a stone;
    attaching means connected to said strap for attaching said strap to a fishing line, said attaching means including a post projecting from said strap substantially perpendicular to the length thereof; and
    a flange means formed on said post.

2. The device of claim 1 wherein said strap comprises an endless band having a certain cross-sectional area.

3. The device of claim 2 wherein said adjustable means comprises a substantially toroidal sleeve having a central opening of an area equal to about twice the area of said band cross-section;
    said sleeve being mounted around two portions of said band and being slidable thereon.

4. A device for attaching a stone or the like to a fishing line, said device comprising:
    a flexible elastic strap having first and second ends and a certain total length when unstressed;
    adjustable means attached to said strap first end to form at least a portion of said strap length into a substantially closed curve for encircling, engaging and conforming to an irregular peripheral surface of a stone; and
    attaching means connected to said strap for attaching said strap to a fishing line;
    said adjustable means including clamping means for clamping said strap thereto at different positions from said strap second end.

5. The device of claim 4 wherein said clamping means includes means for adjusting the clamping force applied to said strap.

* * * * *